(12) United States Patent
Jiang (10) Patent No.: US 6,870,932 B2
(45) Date of Patent: Mar. 22, 2005

(54) FRAME NUMBER IDENTIFICATION AND CIPHERING ACTIVATION TIME SYNCHRONIZATION FOR A WIRELESS COMMUNICATIONS PROTOCOL

(75) Inventor: Sam Shiaw-Shiang Jiang, Hsin-Chu (TW)

(73) Assignees: ASUSTeK Computer Inc., Taipei (TW); ASUS Computer International, Newark, CA (US)

( * ) Notice: Subject to any disclaimer, the term of this patent is extended or adjusted under 35 U.S.C. 154(b) by 659 days.

(21) Appl. No.: 09/849,403

(22) Filed: May 7, 2001

(65) Prior Publication Data

US 2002/0164029 A1 Nov. 7, 2002

(51) Int. Cl.[7] .................................................. H04K 1/00
(52) U.S. Cl. ...................... 380/273; 380/239; 380/270; 380/274; 380/277
(58) Field of Search ................................ 380/239, 270, 380/273–285, 229

(56) References Cited

U.S. PATENT DOCUMENTS

| | | | | |
|---|---|---|---|---|
| 4,605,820 A | * | 8/1986 | Campbell, Jr. ................ | 705/71 |
| 4,688,250 A | | 8/1987 | Corrington et al. | |
| 5,319,712 A | * | 6/1994 | Finkelstein et al. ........... | 380/44 |
| 5,412,722 A | | 5/1995 | Sherly et al. | |
| 2001/0046240 A1 | | 11/2001 | Longoni et al. | |

OTHER PUBLICATIONS

Michell, S., et al, "State Based Key Hop Protocol: A Lightweight Security Protocol for Wireless Networks", National Research Council of Canada, ACM, 2004, entire document.*

Walker, J., "802.11 Security Series, Part II: The Temporal Key Integrity Protocol (TKIP)", Network Security Architect,Platform Networking Group, Intel Corp., 2002, entire document.*

Tick, D., "Airblock Wireless Security for Retail and Industrial Applications", Code Red Systems, Sep. 1, 2003, entire document.*

ETSI TS 125 322 v3.8.0 (Sep. 2001) Universal Mobile Telecommunications System (UMTS); Radio Link Control (RLC) protocol specification (3GPP TS 25.322 version 3.8.0 Release 1999).

* cited by examiner

*Primary Examiner*—Ayaz Sheikh
*Assistant Examiner*—Ronald Baum
(74) *Attorney, Agent, or Firm*—Winston Hsu (57) ABSTRACT

A received PDU is sequentially identified by an n-bit frame number (FN) and an m-bit hyper frame number (HFN), which are synchronously maintained on first and second stations. The second station determines an activation time at which a ciphering key change is to occur, and composes a security mode command that includes an identifying FN corresponding to the activation time, and x least-significant bits (LSBs) from the HFN of the identifying FN. The second station transmits the security mode command to the first station. The x LSBs contained in the security mode command enable the first station to resolve cyclical ambiguities of the identifying FN to properly construct an application time. The first station uses a first ciphering key to decrypt PDUs with FNs sequentially prior to the application time, and uses a second ciphering key to decrypt PDUs with FNs sequentially on or after the application time.

23 Claims, 10 Drawing Sheets

FRAME NUMBER IDENTIFICATION AND CIPHERING ACTIVATION TIME SYNCHRONIZATION FOR A WIRELESS COMMUNICATIONS PROTOCOL

BACKGROUND OF THE INVENTION

1. Field of the Invention

The present invention relates to a wireless communications protocol. More specifically, the present invention discloses a method and associated system and data structure for ensuring proper synchronization of a ciphering key activation time between two stations, and for removing cyclical ambiguity of a frame number (FN) transmitted in a signaling message.

2. Description of the Prior Art

Figure 1:
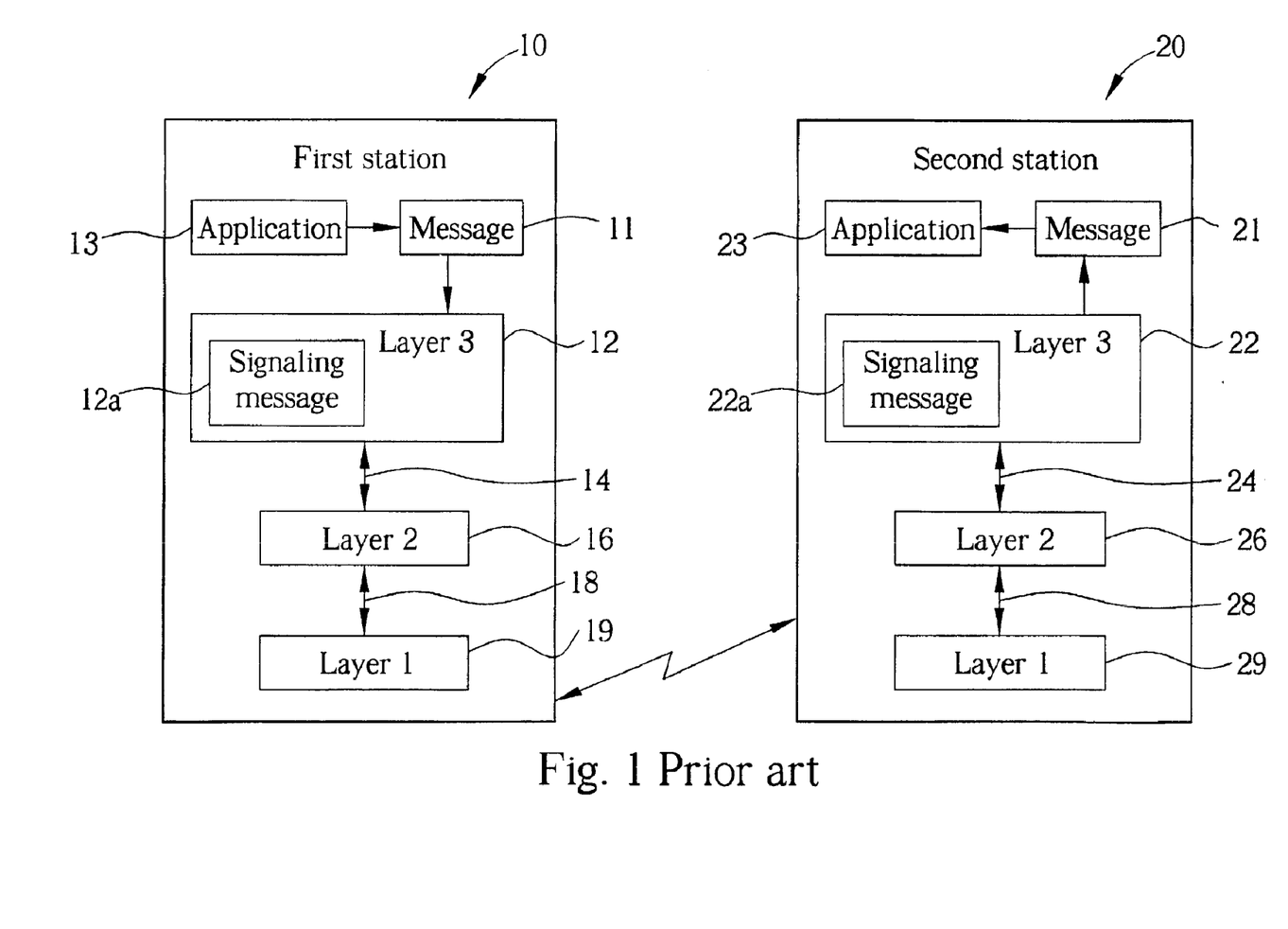
FIG. 1 is a block diagram of a prior art three-layer communications protocol.

The surge in public demand for wireless communication devices has placed pressure upon industry to develop increasingly sophisticated communications standards. The $3^{rd}$ Generation Partnership Project (3GPP™) is an example of such a new communications protocol. These standards utilize a three-layer approach to communications. Please refer to FIG. 1. FIG. 1 is a block diagram of the three layers in such a communications protocol. In a typical wireless environment, a first station 10 is in wireless communications with one or more second stations 20. An application 13 on the first station 10 composes a message 11 and has it delivered to the second station 20 by handing the message 11 to a layer 3 interface 12. The layer 3 interface 12 may also generate some layer 3 signaling messages 12a for the purpose of controlling layer 3 operations. An example of such a layer 3 signaling message is a request for a ciphering reconfiguration activation, which includes a SECURITY MODE COMMAND on downlink (base station to mobile unit) and a SECURITY MODE COMPLETE on uplink (mobile unit to base station). Such layer 3 signaling messages are generated by the layer 3 interfaces 12 or 22 of the first station 10 or the second station 20, respectively. The layer 3 interface 12 delivers either the message 11 or the layer 3 signaling message 12a to a layer 2 interface 16 in the form of layer 2 service data units (SDUs) 14. The layer 2 SDUs 14 may be of any length. The layer 2 interface 16 composes the SDUs 14 into one or more layer 2 protocol data units (PDUS) 18. Each layer 2 PDU 18 is of a fixed length, and is delivered to a layer 1 interface 19. The layer 1 interface 19 is the physical layer, transmitting data to the second station 20. The transmitted data is received by the layer 1 interface 29 of the second station 20 and reconstructed into one or more PDUs 28, which are passed up to the layer 2 interface 26. The layer 2 interface 26 receives the PDUs 28 and builds up one or more layer 2 SDUs 24 from the PDUs 28. The layer 2 SDUs 24 are passed up to the layer 3 interface 22. The layer 3 interface 22, in turn, converts the layer 2 SDUs 24 back into either a message 21, which should be identical to the original message 11 that was generated by the application 13 on the first station 10, or a layer 3 signaling message 22a, which should be identical to the original signaling message 12a generated by the layer 3 interface 12 and which is then processed by the layer 3 interface 22. The received message 21 is passed up to an application 23 on the second station 20. As a note regarding terminology used throughout this disclosure, a PDU is a data unit that is used by a layer internally to transmit and receive information, whereas an SDU is a data unit that is passed up to, or received from, an upper layer. Thus, a layer 3 PDU is exactly the same as a layer 2 SDU. Similarly, a layer 2 PDU could also be termed a layer 1 SDU. For purposes of the following disclosure, the shortened term "SDU" is used to indicate layer 2 SDUs (that is, layer 3 PDUS), and the term "PDU" should be understood as layer 2 PDUs (i.e., layer 1 SDUs).

Figure 2:
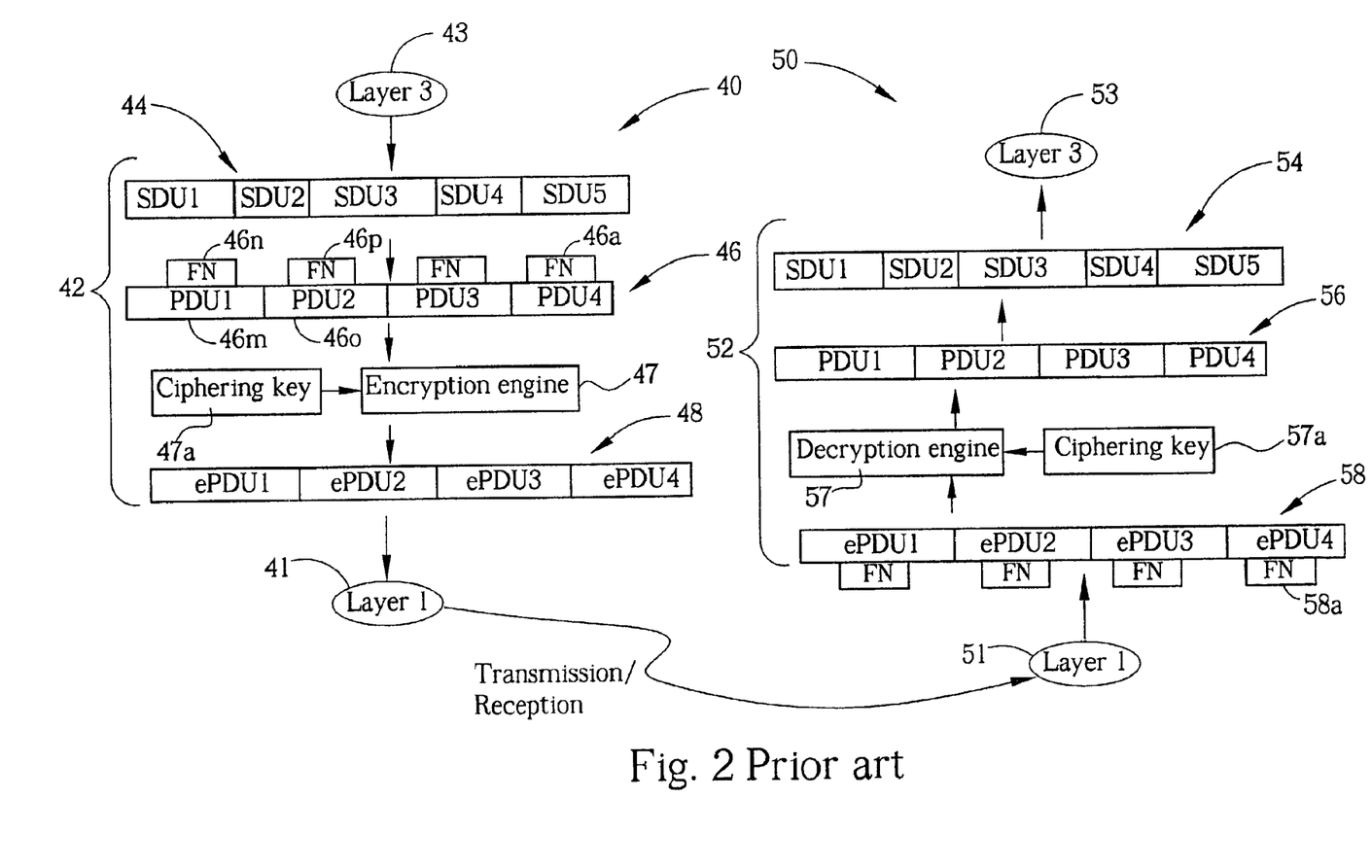
FIG. 2 is a simplified diagram of a prior art transmission/reception process from a layer 2 perspective.

Of note are the layer 2 interfaces 16 and 26, which act as a buffers between the relatively high-end data transmission and reception requests of the layer 3 interfaces 12 and 22, and the low-level requirements of the physical transmission and reception process at the layer 1 interfaces 19 and 29. Please refer to FIG. 2. FIG. 2 is a simplified diagram of a transmission/reception process from a layer 2 perspective. A layer 2 interface 42 of a first station 40 receives a string of SDUs 44 from a layer 3 interface 43. The SDUs 44 are sequentially ordered from 1 to 5, and are of an unequal length. The layer 2 interface 42 converts the string of layer 2 SDUs 44 into a string of layer 2 PDUs 46. The PDUs 46 are sequentially ordered from 1 to 4, and are all of an equal length. Depending on the type of transmission mode used, each PDU 46 may have a header that includes a sequence number to explicitly indicate the sequential order of each PDU 46 within the stream of transmitted PDUs 46. This better enables a second station 50 to properly determine the sequential ordering of a received stream of PDUs 58, and thus properly reconstruct corresponding SDUs 54 from the received PDUs 58. These header-inclusive transmission modes include acknowledged mode (AM) transmissions, and unacknowledged mode (UM) transmissions. Both AM and UM type transmissions require the addition of the header to each PDU 46 by the transmitting station 40 to hold the inclusive sequence number. These headers increase the overall transmission overhead. Alternatively, a transparent mode (TM) transmission method can be used, in which case the layer 2 interface 42 adds no data to the PDUs 46, but instead simply segments them into proper lengths. The TM transmission method consequently has a minimum of transmission overhead associated with it, but makes the assembly of the received PDUs 58 potentially more difficult and error-prone. In TM transmissions, each PDU 46 has an associated connection frame number to identify that PDU 46. The connection frame number is never, however, actually transmitted with the PDU 46, unlike the sequence numbers in AM and UM transmissions. For purposes of the present invention, a general term "frame number" (FN) shall be employed. An FN may represent either a connection frame number or a sequence number, depending upon the transmission mode used. The bit size of an FN will vary depending on the transmission method used. For example, in TM transmissions, each PDU 46 is assigned an 8-bit FN. In UM transmissions, the FN is a 7-bit value held in the PDU 46 header, whereas in AM transmissions the FN is a 12-bit value held in the header.

Each layer 2 PDU 46 in the string of PDUs 46 thus has an associated FN 46a. As noted above, the FN 46a may or may not be an actual part of the corresponding PDU 46, but, regardless of this, the FN 56a is an n-bit number assigned by the layer 2 interface 42 to the PDU 46. The FNs 46a of succeeding PDUs 46 are successively incremented. For example, if PDU1 46m has an FN 46n of 192, then PDU2 46o would have an associated FN 46p of 193, and so forth. Note that roll-over of the FNs 46a (which occurs at a value of $2^n-1$ as each FN 46a is an n-bit number) can cause sequentially later PDUs 46 to have FNs 46a that are numerically less than those of sequentially earlier PDUs 46. The FNs 46a thus have a cyclical ambiguity. That is, every $2^n-1$ PDUs 46, the FNs 46a repeat, and thus the PDUs 46 are not uniquely identified by the FNs 46a, but only uniquely identified within each cycle of the FNs 46a. This may lead to confusion between the first station 40 and the second station 50 when a signaling message is passed between the two stations 40 and 50 that indicates only an FN 46a as a reference. A specific example of this shall be enumerated in the following.

The layer 2 PDUs 46 are encrypted by an encryption engine 47. The encryption of the PDUs 46 includes many variables, but, in particular, the encryption engine 47 utilizes the FN 46a of each PDU 46, and a ciphering key 47a. The ciphering key 47a is provided by the layer 3 interface 43, by way of command primitives. The result is a string of encrypted PDUs 48, which is then sent off to a layer 1 interface 41 for transmission. A reverse process occurs at the second station 50. The second station 50 associates an FN 58a with each received encrypted PDU 58. This association is either explicit, by extracting the FNs 58a from the header of each received encrypted PDU 58, or implicit by assignment, i.e., by the layer 2 interface 52 simply assigning the FN 58a to each encrypted PDU 58. If the FNs 58a are assigned by the layer 2 interface 52, then the FNs 58a should be synchronized with the corresponding FNs 46a maintained by the first station 40. The FNs 58a, along with a ciphering key 57a, are used by a decryption engine 57 to decrypt the encrypted PDUs 58 into decrypted PDUs 56. The decrypted PDUs 56 are converted into a received string of layer 2 SDUs 54, which are then passed up to a layer 3 interface 53.

For the encrypted PDUs 58 to be properly decrypted into the decrypted PDUs 56, the decryption engine 57 must use a ciphering key 57a that is identical to the ciphering key 47a. A layer 3 signaling message, a so-called ciphering reconfiguration activation command, is used to synchronize the ciphering keys 47a and 57a. Periodically, the first station 40 may wish to change its ciphering key 47a for the sake of security. The layer 3 interface 43 will thus compose a layer 3 ciphering reconfiguration activation command, indicating the changing of the ciphering key 47a, and when this key change will take effect. For the sake of simplicity, though, rather than using an actual time, the ciphering reconfiguration activation command indicates an activation time. This activation time is simply a layer 2 PDU FN value. PDUs 46 with FNs 46a that are sequentially before the activation time are encrypted using the old ciphering key 47a. PDUs 46 with FNs 46a that are sequentially on or after the activation time are encrypted using a new ciphering key 47a. By indicating the ciphering key and the activation time in the ciphering reconfiguration activation command, the first station 40 ensures that the ciphering process will be properly synchronized with the second station 50. After reception of the ciphering reconfiguration activation command, the second station 50 will use the old ciphering key 57a to decrypt encrypted PDUs 58 having FNs 58a that are sequentially prior to the activation time. The second station 50 will use the new ciphering key 57a to decrypt encrypted PDUs 58 having FNs 58a that are sequentially on or after the activation time.

Figure 3:
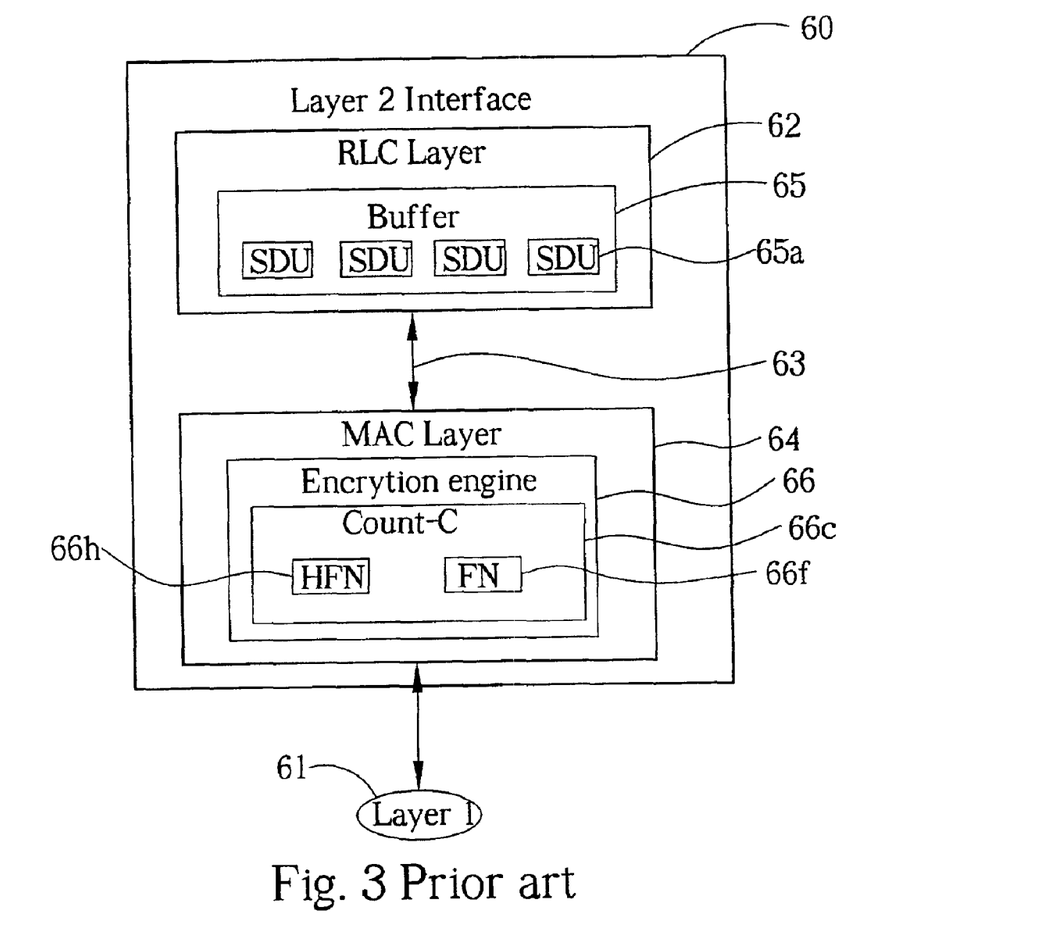
FIG. 3 is a more detailed block diagram of a prior art layer 2 interface.
Figure 4:
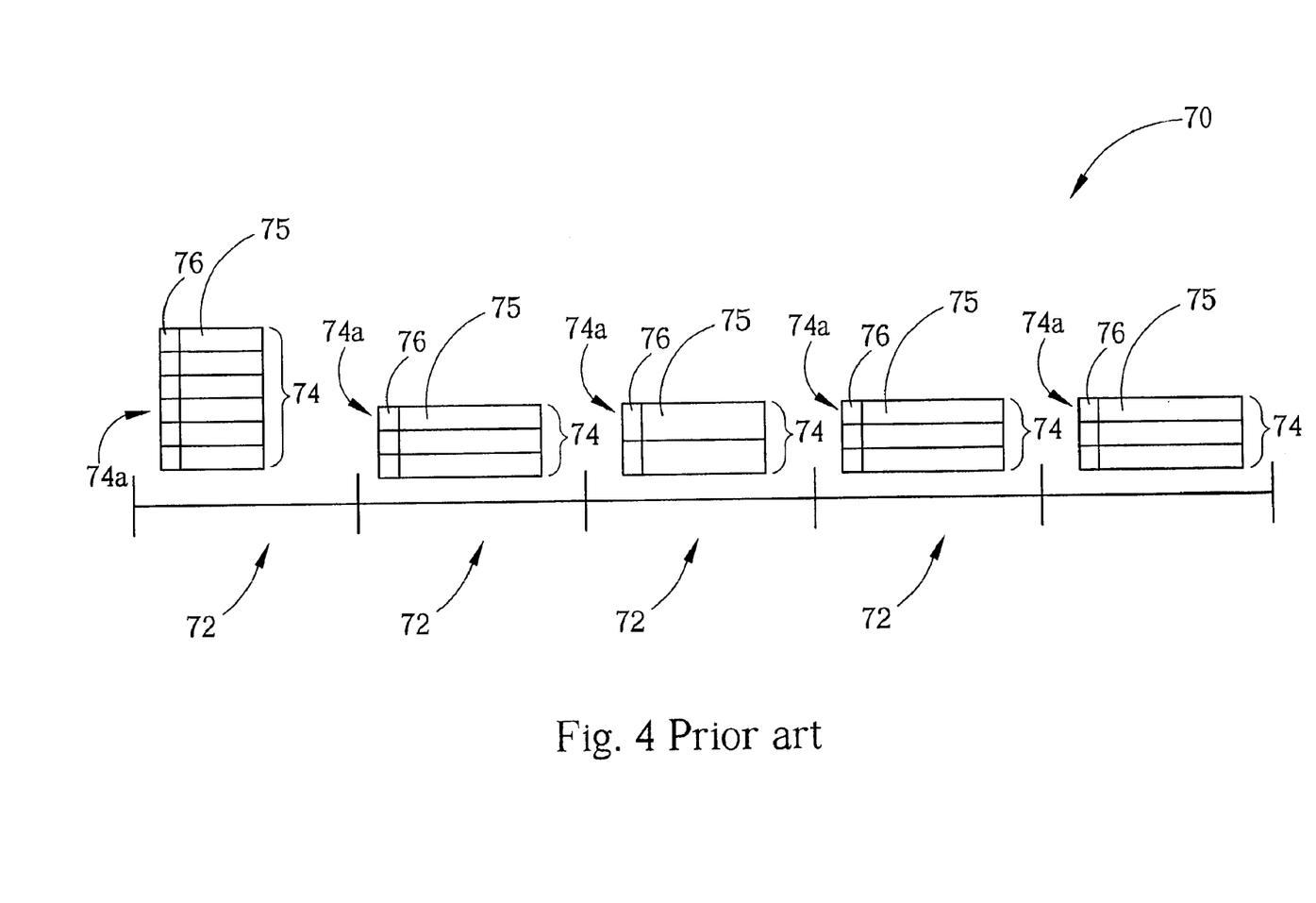
FIG. 4 is a timing diagram of transmission time intervals (TTIs) that are used by the layer 2 interface of FIG. 3.

Please refer to FIGS. 3 in conjunction with FIG. 4. FIG. 3 is a more detailed block diagram of a prior art layer 2 interface 60. FIG. 4 is a timing diagram of transmission time intervals (TTIs) 72 that are used by the layer 2 interface 60. The layer 2 interface 60 comprises a radio link control (RLC) layer 62 on top of, and in communications with, a medium access control (MAC) layer 64. The MAC layer 64 acts as an interface between the RLC layer 62 and the layer 1 interface 61. The MAC layer 64 divides the transmission of PDUs 63, which the MAC layer 64 receives from the RLC layer 62, into a series of transmission time intervals (TTIs) 72. Each TTI 72 has an interval length that is identical to the other TTIs 72, such as a 20 millisecond (ms) interval. Within the time span of each TTI 72, the MAC layer 64 sends off a transport blocks set 74 to the layer 1 interface 61 to be transmitted. The transport block set 74 comprises a predetermined number of transport blocks 74a. Each of the transport blocks 74a comprises one RLC PDU 75 and may optionally carry a MAC header. In TM transmissions, the MAC layer 64 generally will not add any header to the RLC PDUs 75, and thus a transport block 74a is identical to an RLC PDU 75, as is indicated in FIG. 4. All of the RLC PDUs 75, and thus the transport blocks 74a, within each TTI 72, are of the same length. The number of RLC PDUs 75 (or equivalent transport blocks 74a) within each transport block set 74 between TTIs 72 may change. For example, in FIG. 4 the first TTI 72 transmits six PDUs 75, and the subsequent TTI 72 transmits three PDUs 75. The actual data length of the PDUs 75 may also vary from TTI 72 to TTI 72, but is always the same within each TTI 72. Consequently, prior to transmission for each TTI 72, the MAC layer 64 informs the RLC layer 62 of the number of PDUs 75 required for the TTI 72, and the size for the PDUs 75 within the TTI 72. The RLC layer 62 composes SDUs 65a, held in a buffer 65, into appropriately sized PDUs 63, and delivers the required number of PDUs 63 to the MAC layer 64. In TM transmissions, it is the MAC layer 64 that internally associates an FN 76 with each transport block 74a, and is thus responsible for encryption and decryption of the RLC PDUs 75 in each TTI 72. Note that, in TM transmissions, each FN 76 is not actually transmitted, but is only associated with a corresponding transport block 74a. In FIG. 3, TM transmissions are assumed, and thus an encryption engine 66 is shown as within the MAC layer 64. However, in UM and AM transmissions, as the FNs 76 are actually a part of the RLC PDUs 63, encryption can be performed by the RLC layer 62.

For purposes of security, the PDUs 63, 75 are encrypted before being delivered to the layer 1 interface 61. The encryption is usually performed in either the MAC layer 64 or the RLC layer 62. As noted above, for purposes of the present example, it will be assumed that a TM transmission method is employed, and so it is the MAC layer 64 that performs the encryption process, as it is the MAC layer 64 that assigns the FN 76 to each transport block 75. Prior to delivering transport block sets 74 to the layer 1 interface 61, an encryption engine 66 within the MAC layer 64 encrypts all of data within each PDU 63 to generate encrypted PDUs 75 within each transport block set 74. The encryption engine 66 uses the FN 76 of each PDU 75, as well as at least one ciphering key 68, to generate the encrypted PDUs 75. Consequently, on the receiver side, the receiver FNs must be synchronized with the transmitter FNs 76 to perform the decryption of the PDUs 75. Of course, such synchronization is not a problem in AM and UM transmissions, as the FNs 76 are explicitly included with the transmitted PDUs 75. The FN 76 associated with each PDU 63, 75 is used to form a count-c value 66c for that PDU 63, 75. The count-c value 66c is a 32-bit number that comprises a hyper-frame number (HFN) 66h as the most significant 32-n bits (as the FN 76 is an n-bit number), and an FN 66f of the PDU 63, 75 to be encrypted as the least significant n bits. The HFN 66h is initially set to zero, or a specific value specified by the radio access network, and is incremented upon detection of rollover in the PDU 63, 75 FN 76. For example, if the HFN 66h has a value of zero, and a PDU 63, 75 has an associated FN 76 of 255, count-c 66c would have a value of 255 that is used to encrypt the PDU 63 to generate the encrypted PDU 75. A subsequent PDU 63, 75 would have an FN 76 of zero, due to rollover, and the encryption engine 66 would thus increment the HFN value 66h to one. Count-c 66c, used to encrypt this subsequent PDU 63, would thus be 256. The HFN 66h is used in all transmission modes, AM, UM and TM. Although the FN values 76 may or may not be transmitted with the PDUs 75, depending on the transmission method employed, the HFN value 66h is never transmitted. The FNs 76 and HFN 66h thus must both remain synchronized on both the reception and transmission sides for the PDUs 75 to undergo a proper encryption/decryption cycle. Note that item 76 has been used to indicate an n-bit FN value. In terms of encryption and decryption, however, it is more correct to say that each item 76 associated with a PDU 75 is, in fact, a count-c value 66c that includes the HFN 66h for that particular FN 76. That is, within one transport block set 74, due to roll-over, one group of preceding FNs 76 may have associated with them an HFN 66h that is a unit less than the HFNs 66h associated with the succeeding FNs 76. It is the responsibility of the layer 2 interface 60 to ensure that each PDU 75 has associated with it the correct HFN 66h/FN 76 pair to generate a correct count-c 66c to properly encrypt or decrypt a PDU 75.

Figure 5:
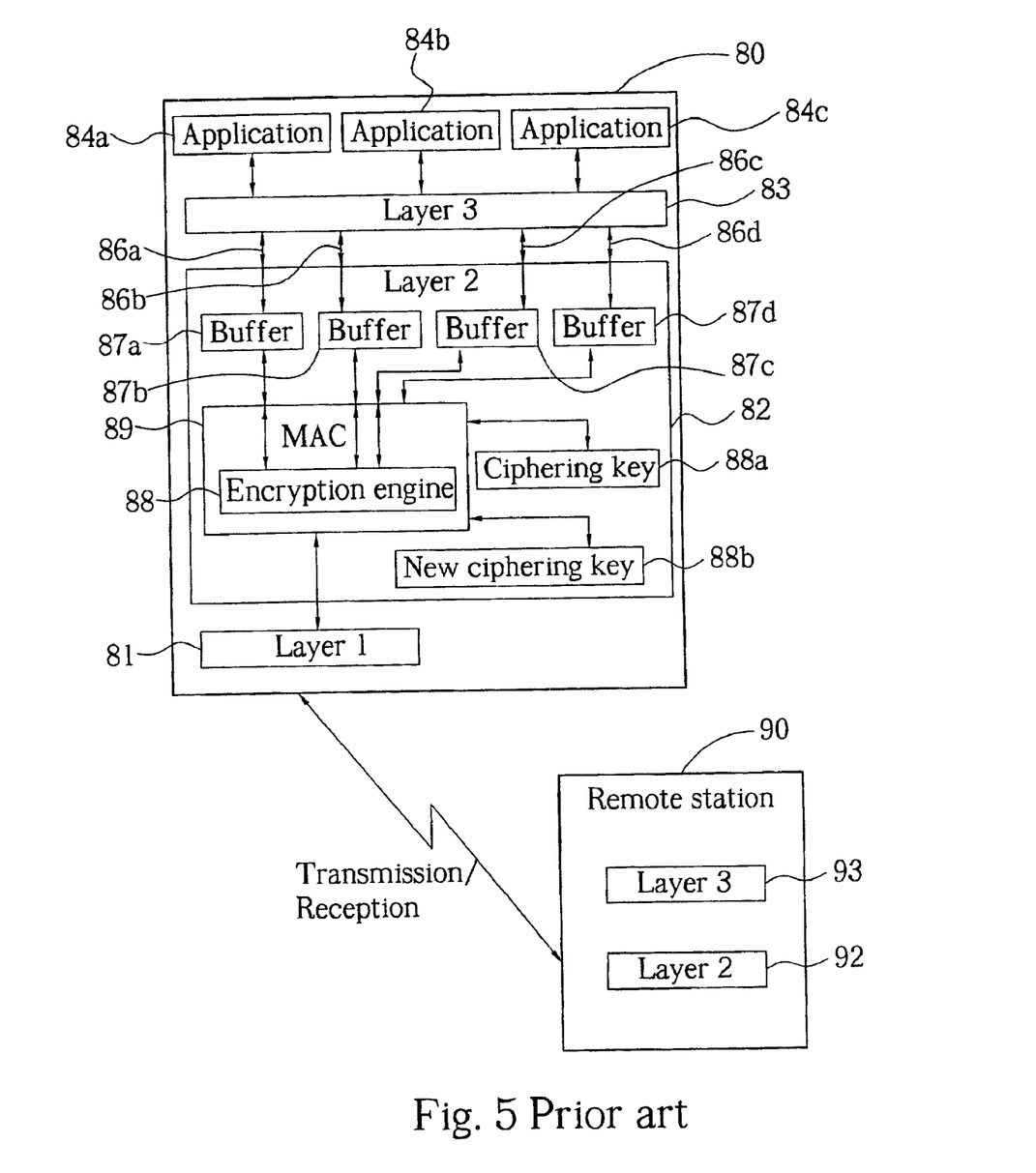
FIG. 5 is a block diagram of a prior art first station utilizing several channels to communicate with a remote station.

The communications protocol supports the simultaneous use of several channels from the layer 2 interface 60. Please refer to FIG. 5. FIG. 5 is a block diagram of a first station 80 utilizing several channels 86a, 86b, 86c, 86d for communications purposes. Again, TM transmissions are assumed for the present example. The first station 80 has applications 84a, 84b and 84c running simultaneously, each of which is in communications with a layer 3 interface 83. For each application 84a to 84c, the layer 3 interface 83 creates a corresponding TM channel 86a to 86c with a layer 2 interface 82. Additionally, the layer 3 interface 83 establishes a unique signaling channel 86d to communicate with a layer 3 interface 93 on a remote station 90. The signaling channel 86d employs an AM transmission method so that both the first station 80 and the remote station 90 receive reception confirmation of any signaling messages passed between them. Layer 2 SDUs are exchanged between the layer 2 interface 82 and the layer 3 interface 83 along the channels 86a to 86d. Each channel 86a to 86d has a corresponding buffer 87a to 87d, which is used to transform the layer 2 SDU data into layer 2 PDUs. Thus, data from applications 84a, 84b and 84c is sent to the layer 2 interface 82 by the layer 3 interface 83 along the TM channels 86a, 86b and 86c, respectively, in the form of layer 2 SDUs. Additionally, signaling data for the layer 3 interfaces 83, 93 is sent to the layer 2 interface 82 along the AM channel 86d. All of these SDUs land into their corresponding buffers 87a, 87b, 87c and 87d, and are converted into layer 2 PDUs. A consequence of this is that each buffer 87a to 87d uses its own set of PDU FNs and HFNs, independently of the other buffers 87a to 87d. The PDUs from the buffers 87a to 87d are fed into a MAC layer 89. The MAC layer 89 utilizes an encryption engine 88, which uses a ciphering key 88a, to generate encrypted PDUs for each TTI of the channels 86a to 86c. As previously described, the encryption engine 88 also uses the HFN/FN pair (i.e., the count-c value) of each PDU to perform the encryption. The AM signaling channel 86d does not need to use the MAC layer 89 encryption engine 88, as encryption is performed in the RLC layer (item 62 of FIG. 3) for AM transmissions. Each transport block set in the TTI, now containing encrypted PDU data, is then sent off to a layer 1 interface 81 for transmission.

Figure 6:
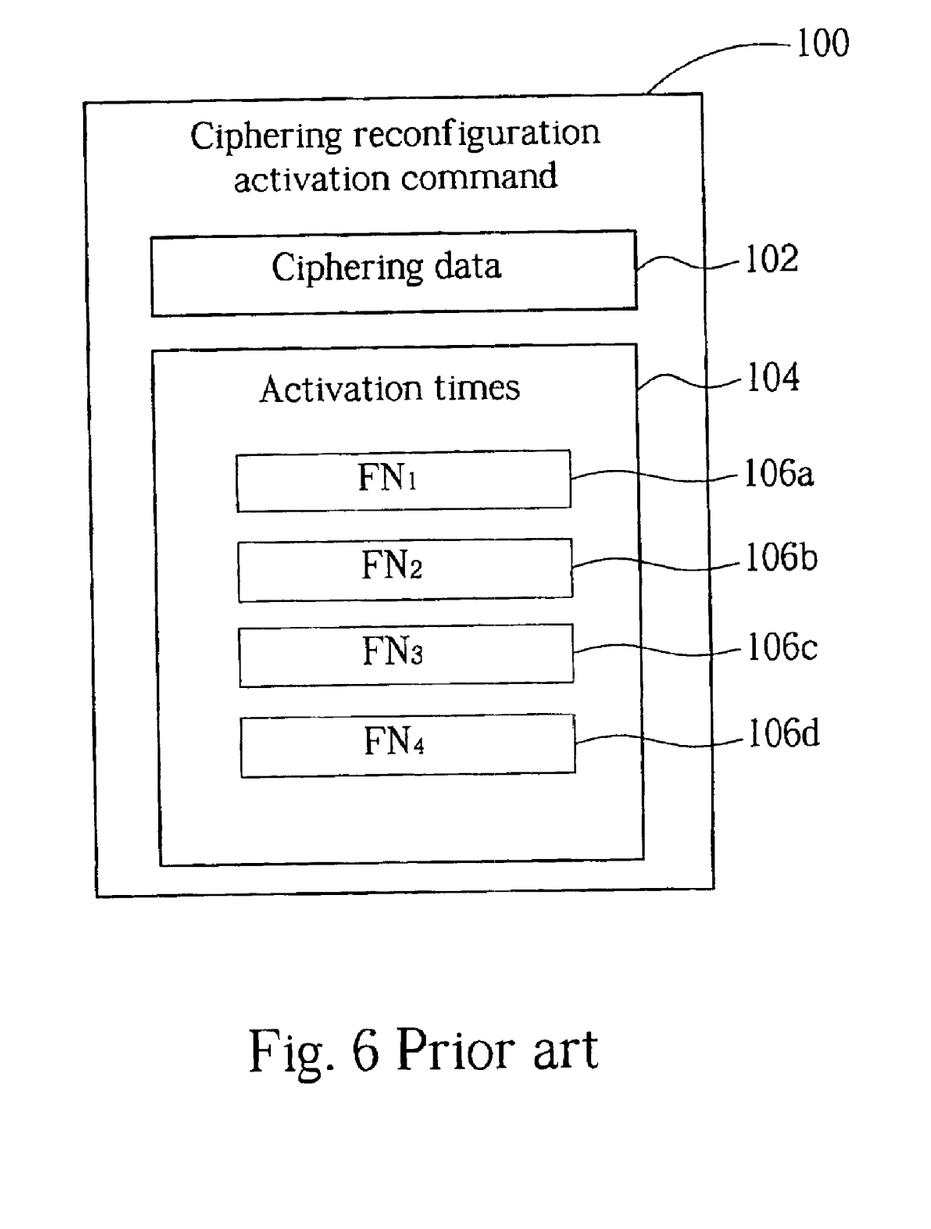
FIG. 6 is a simplified block diagram of a prior art ciphering reconfiguration activation command.

Please refer to FIG. 6 in conjunction with FIG. 5. FIG. 6 is a simplified block diagram of a ciphering reconfiguration activation command 100. As noted previously, the layer 3 interface 83 may, from time to time, desire to change the ciphering key 88a. To perform this change to the ciphering key 88a, the layer 3 interface 83 sends the ciphering reconfiguration activation command 100 along the signaling channel 86d to the layer 3 interface 93 of the remote station 90. The ciphering reconfiguration activation command 100 is a layer 3 signaling message that is carried by layer 2 PDUs. Consequently, the ciphering reconfiguration activation command 100 is itself encrypted, and is treated by the layer 2 interfaces 82, 92, like any other layer 3 data, without being given any special consideration. The ciphering reconfiguration activation command 100 comprises ciphering data 102, and, in particular, activation times 104. The ciphering data 102 is not of direct relevance to the present invention, and so is glossed over. The ciphering data 102, however, may contain, for example, data to indicate which new ciphering key 88b is to be used. The new ciphering key 88b is already present on both the first station 80 and the remote station 90, having been transferred by a previous layer 3 signaling message. Of interest to the present invention are the activation times 104. The activation times 104 comprises a plurality of FNs 106a, 106b, 106c and 106d. Each FN 106a to 106d corresponds to one of the channels 86a to 86d, respectively, and, as previously described, tells the remote station 90 at what FN value the new ciphering key 88b should be applied for that channel 86a to 86d. For example, suppose that the first station 80 determines that, after the next 30 PDUs, the new ciphering key 88b will be used. If the first channel 86a has a current FN of 148, then $FN_1$ 106a will hold a value of 178. If the second channel 86b has a current FN of 245, then $FN_2$ 106b will hold a value of 19, due to roll-over of the 8-bit FN. Upon reception of the ciphering reconfiguration activation command 100, the remote station 90 uses its equivalent of the new ciphering key 88b on received or transmitted PDUs whose associated FNs along a channel 86a to 86d are sequentially on or after the corresponding FN activation times 106a to 106d for that channel 86a to 86d. The ciphering reconfiguration activation command 100 thus enables ciphering synchronization between the first station 80 and the remote station 90 for all channels 86a to 86d. Of course, four channels 86a to 86d have been indicated in the forgoing. It should be obvious, however, that fewer or greater numbers of channels are possible, with a corresponding decrease or increase in the number of entries within the activation times 104.

Unfortunately, the activation times 104 can lead to some ambiguity due to the cyclical nature of the PDU FNs. This ambiguity occurs because each of the channels 86a to 86d can run independently of each other. Suppose, for example, that the current FN for channel 86c for the remote station 90 is 100, with a corresponding activation time of 220 received within $FN_3$ 106c of the ciphering reconfiguration activation command 100. The remote station 90 can assume one of two possibilities: (a) the intended activation time $FN_3$ 106c of 220 is in the current FN cycle, in which case, after receiving 119 more PDUs along the channel 86c, the new ciphering key will be applied, or (b) the intended activation time $FN_3$ 106c of 220 was in the previous FN cycle, and so has elapsed. In this case, the remote station 90 should apply the new ciphering key immediately to channel 86c. The current protocol insists that the remote station always assume case (a). This, however, is not always correct. If case (b) were, in fact, the correct choice, the remote station 90 could potentially end up incorrectly decrypting 255 PDUs. In the worst case (depending on the configuration of the TTIs), this could lead to 2.5 seconds of noise.

SUMMARY OF THE INVENTION

It is therefore a primary objective of this invention to provide a method and associated data structure and system that removes ambiguity of an n-bit identifying frame number (FN) in a signaling message. It is a further objective to employ this method to enable unambiguous synchronization between two or more wireless stations when performing a ciphering key change.

Briefly summarized, the preferred embodiment of the present invention discloses a method and related system and data structure for synchronizing a ciphering key change in a wireless communications system. The wireless communications system includes a first station and a second station. The first station can receive a security mode command to effect a ciphering change, and can also receive encrypted layer 2 protocol data units (PDUs). Each received PDU is sequentially identified by an n-bit frame number (FN). The first station has a first m-bit hyper frame number (HFN), and a decryption unit capable of decrypting received PDUs according to at least a first ciphering key, the first HFN, and the FN of each received PDU. The second station can transmit the security mode command, and can also transmit encrypted PDUs. The second station includes a second m-bit HFN, and an encryption unit capable of encrypting transmitted PDUs according to at least the first ciphering key, the second HFN, and the FN associated with each transmitted PDU. The second station determines an activation time at which a ciphering key change is to occur, and then composes the security mode command. The security mode command includes an identifying FN corresponding to the activation time, and x least-significant bits (LSBs) from the second HFN that correspond to the activation time. The second station transmits the security mode command to the first station. The first station utilizes the identifying FN and the x LSBs from the second HFN contained in the security mode command to obtain an application time. The first station uses the first ciphering key to decrypt PDUs with FNs sequentially prior to the application time, and uses a second ciphering key to decrypt PDUs with FNs sequentially after the application time.

It is an advantage of the present invention that by supplying the x LSBs of the second HFN, the first station can more accurately determine the intended FN cycle in which the activation time is intended. Correct synchronization of the ciphering key change thus takes place with greater assurance. Furthermore, this method can be employed in other signaling messages that utilize an identifying frame number.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

In the following description, a communications protocol as disclosed in the 3GPP™ specifications TS 25.322, V3.5.0, and TS 25.331, is used by way of example. However, it should be clear to one in the art that any wireless communications protocol that requires synchronization between two or more stations for a ciphering key change may utilize the method of the present invention. Stations can both transmit and receive data. In the following description, a station may be a mobile telephone, a handheld transceiver, a base station, a personal data assistant (PDA), a computer, or any other device that requires the wireless exchange of data. Incidentally, it should be understood that many means may be used for the physical layer 1 to effect wireless transmissions, and that any such means may be used for the method and system hereinafter disclosed.

Figure 7:
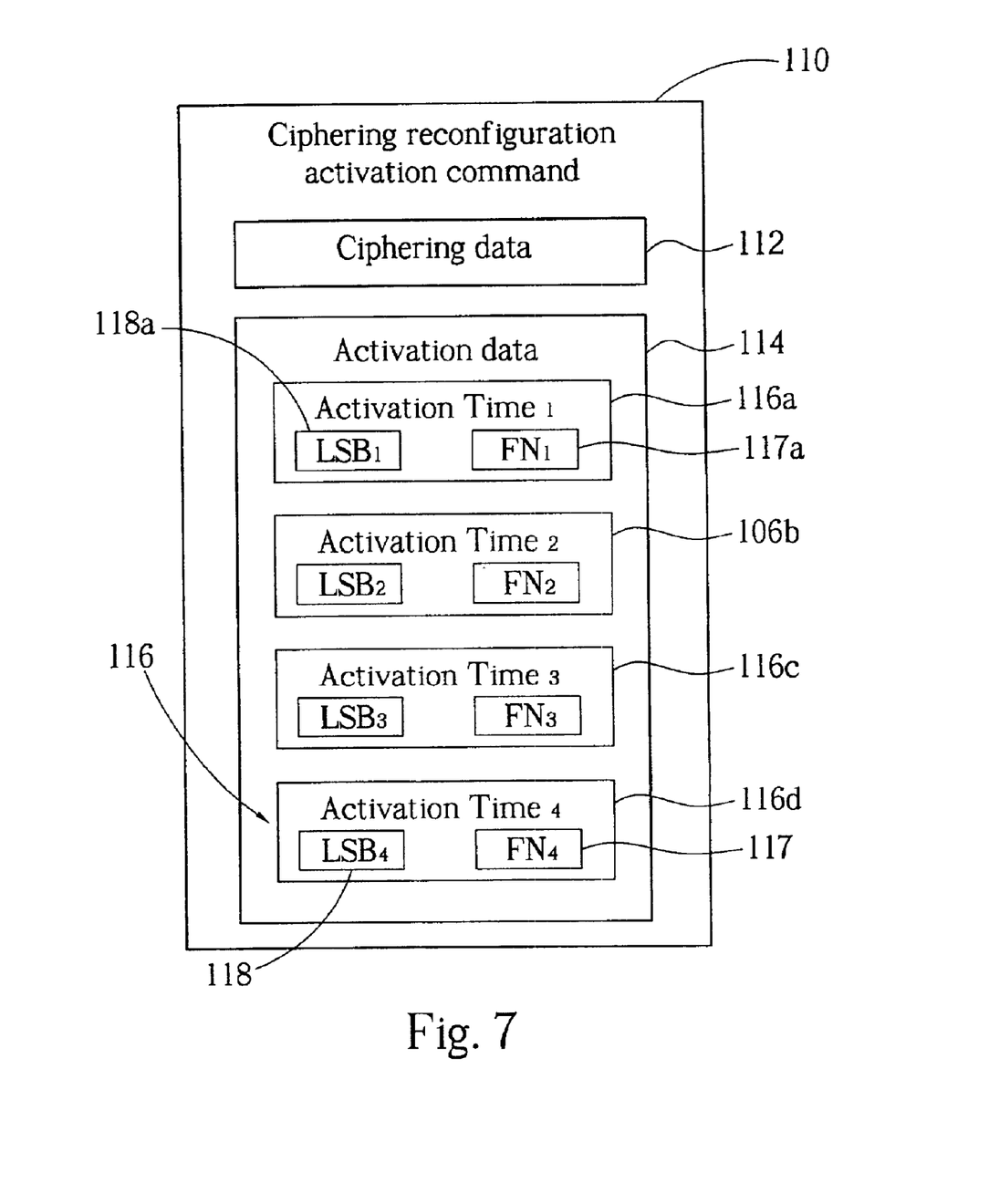
FIG. 7 is a simplified block diagram of a ciphering reconfiguration activation command according to the present invention.

Please refer to FIG. 7. FIG. 7 is a simplified block diagram of a ciphering reconfiguration activation command 110 according to the method of the present invention. It is a key aspect of the present invention to utilize not just a frame number (FN) for an activation time to indicate a ciphering key activation time, but also the x low order bits of the hyper frame number (HFN) associated with each FN of the activation time. In the preferred embodiment, x is two, so that the two least significant bits (LSBs) from the associated HFN are packed with each FN.

The ciphering reconfiguration activation command 110 comprises ciphering data 112 and activation data 114. Although not of direct relevance to the present invention, amongst other items, the ciphering data 112 should include reference to a new ciphering key that is to be employed. The new ciphering key should already be present on a first station that transmits the ciphering reconfiguration activation command 110, and on a second station that receives the ciphering reconfiguration activation command 110. Alternatively, the ciphering data 112 could actually hold the new ciphering key that is to be used.

The activation data 114, which is of key importance to the present invention, contains a list of activation times 116a to 116d. Although the activation data 114 is depicted in FIG. 7 as holding four activation times 116a to 116d, it should be understood that a variable number of such activation times 116 is possible, four being indicated here merely for simplicity of discussion. At least one activation time 116 should, however, be present in the activation data 114. Each activation time 116a to 116d corresponds to a communications channel employed between the first station and the second station. Each activation time 116 comprises the x least significant bits (LSBs) 118 of a hyper frame number (HFN), and an n-bit identifying frame number (FN) 117. In the preferred embodiment, x is two and n is 7, 8 or 12 depending on the transmission method used, so that the two LSBs of an HFN are stored in each LSB 118, and an 7, 8 or 12-bit FN is stored in each FN 117. Each HFN LSB 118/FN 117 pair correspond to an activation time for the related communications channel. Layer 2 protocol data units (PDUs) transmitted along that channel that are sequentially prior to the activation time are encrypted/decrypted using an old ciphering key. PDUs transmitted along the channel that are sequentially after the activation time are encrypted/decrypted using a new ciphering key. Each FN 117 is an identifying FN for a cross-over PDU. Each LSB 118 enables a receiver of the FN 117 to determine the cyclical positioning of the FN 117, and thereby remove any cyclical ambiguity of the FN 117. This is outlined in more detail in the following.

Figure 8:
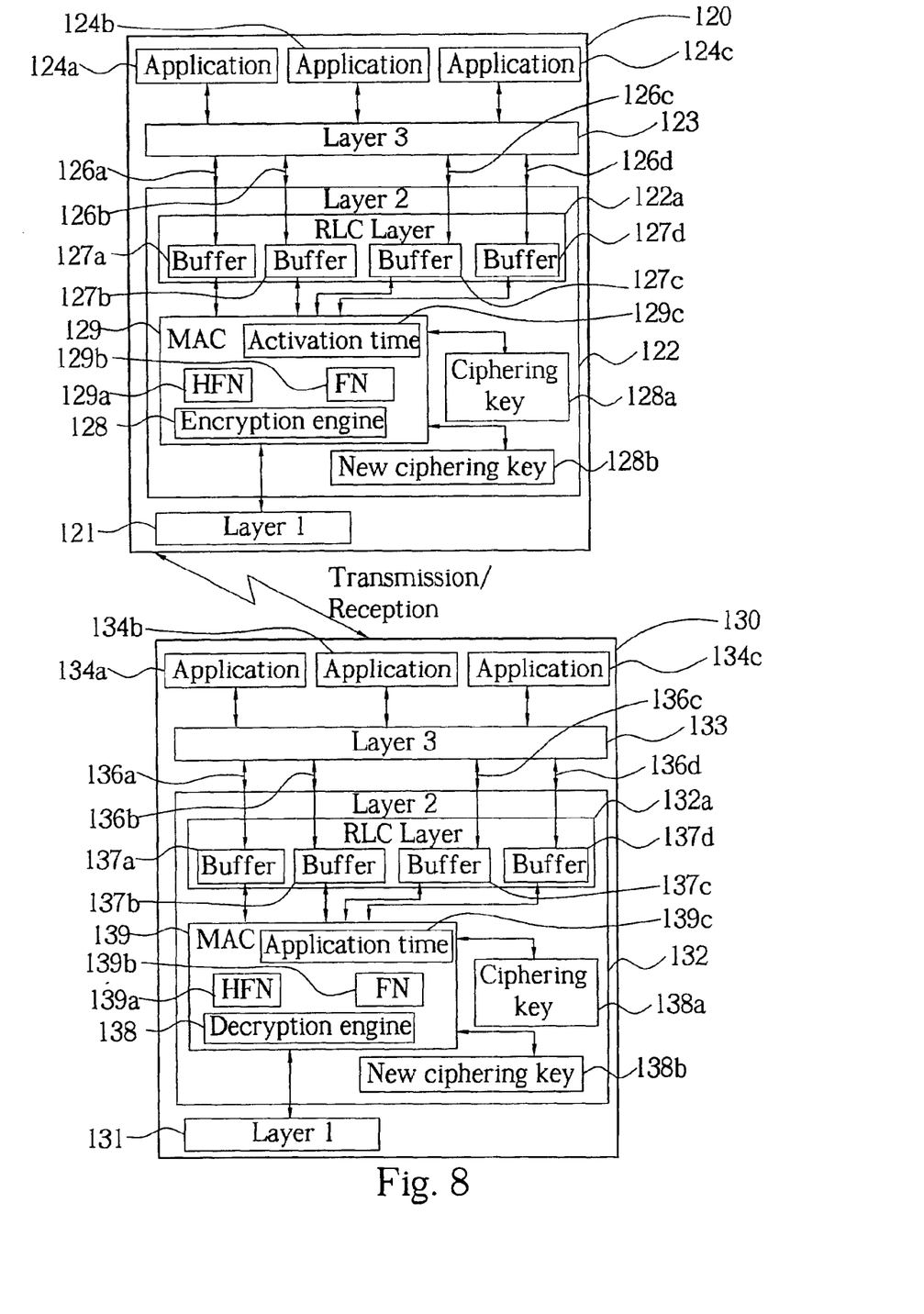
FIG. 8 is a simplified block diagram of a first station and a second station that utilize the method of the present invention.

Please refer to FIG. 8 with reference to FIG. 7. FIG. 8 is a simplified block diagram of a first station 120 and a second station 130 that utilize the present invention. The first station 120 has a plurality of applications 124a, 124b, 124c that are in wireless communications with corresponding applications 134a, 134b, 134c on the second station 130. Transparent mode (TM) transmission between the applications 124a to 124c and 134a to 134c is assumed, but is not required. Acknowledged mode (AM) and unacknowledged mode (UM) transmission methods are also possible. The first station 120 and the second station 130 both utilize a three-layered wireless communications protocol that comprises a layer 3 interface 123, 133, a layer 2 interface 122, 132, and a layer 1 interface 121, 131. To effect wireless communications, each application 124a to 124c, and 134a to 134c, exchanges data with the corresponding layer 3 interface 123, 133, respectively. On the first station 120, the layer 3 interface 123 establishes a respective TM channel 126a, 126b, 126c for each application 124a, 124b, 124c with the layer 2 interface 122. Similarly, the layer 3 interface 133 on the second station 130 establishes three respective TM channels 136a, 136b, 136c with the layer 2 interface 132 for the applications 134a, 134b, 134c. Additionally, the layer 3 interfaces 123, 133 establish a dedicated AM signaling channel 126d, 136d to exchange layer 3 signaling information, such as the ciphering reconfiguration activation command 110. For each channel 126a, 126b, 126c and 126d, the layer 2 interface 122 establishes a respective buffer 127a, 127b, 127c and 127d. The buffers 127a to 127d are used to store incoming and outgoing data between the layer 2 interface 122 and the layer 3 interface 123 along the channels 126a to 126d, respectively. Data is exchanged along the channels 126a to 126d in the form of layer 2 service data units (SDUs), i.e., layer 3 protocol data units (PDUs). Each buffer 127a to 127d is in communications with a medium access control (MAC) layer 129. Layer 2 PDUs are exchanged between the MAC 129 and the buffers 127a to 127d. The data structure of such PDUs is not indicated in the following as it can be quite complicated and is of no direct relevance to the present invention. For each buffer 127a to 127c, the MAC 129 assigns a 24-bit hyper frame number (HFN) 129a. For the sake of simplicity, only a single HFN 129a is indicated in FIG. 8. It should be understood, however, that the HFN 129a is, in fact, a separate HFN for each buffer 127a to 127c. Additionally, as a TM method is used, an 8-bit frame number (FN) 129b is incrementally assigned to each successive PDU received by the MAC 129 from the buffers 127a to 127c, or from the layer 1 interface 121. The signaling channel 126d also has an HFN 129a, which is a 20-bit value, and 12-bit FNs 129b are explicitly carried by each PDU. Every PDU in the buffers 127a to 127c is assigned an FN 129b by the MAC 129. As with the HFN 129a, for the sake of simplicity, only a single FN 129b is shown for all of the PDUs within their respective buffers 127a to 127d. Each buffer 127a to 127d thus has its own HFN 129a and ranges of FN 129b values for stored PDUs. An HFN 129a/FN 129b pair that is 32 bits in length is thus assigned to each PDU stored in the buffers 127a to 127d.

Figure 9:
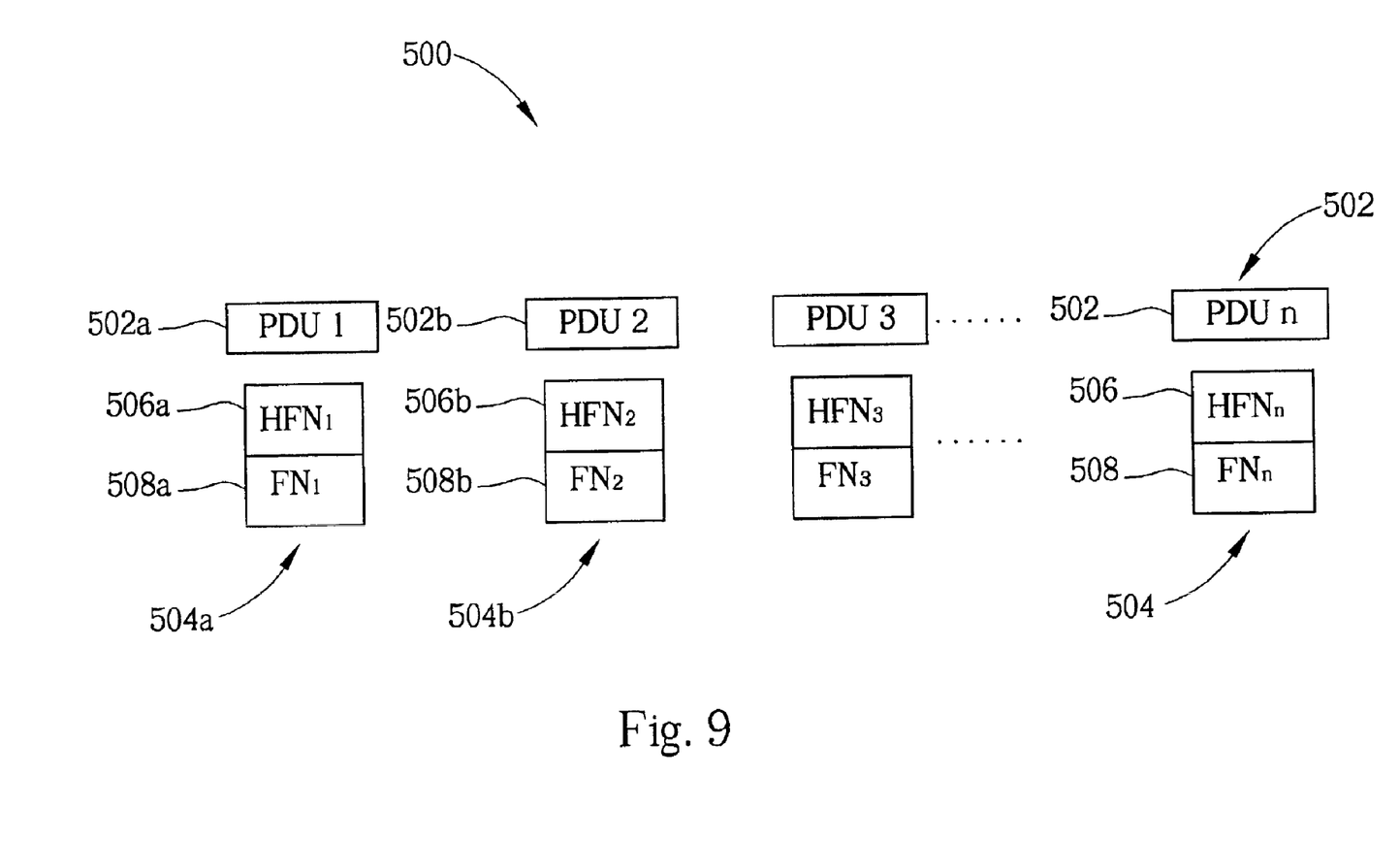
FIG. 9 illustrates an example stream of protocol data units (PDUs) received by a medium access control (MAC) layer from a communications channel.

To better illustrate the above, please refer to FIG. 9 with reference to FIG. 8. FIG. 9 illustrates an example stream of PDUs 500 received by the MAC 129 from the TM channel 126a. The stream of PDUs 500 comprises a plurality of sequentially received PDUs 502. The MAC 129 assigns to each PDU 502 an HFN/FN pair 504. The HFN/FN pair 504 comprises a 24-bit HFN 506, and an 8-bit FN 508. Each successive PDU 502 has an incrementally higher FN 508. On roll-over of the FN 508, the HFN 506 of the next PDU 502 is incremented. For example, if PDU1 502a has been assigned a value of 255 for $FN_1$ 508a, and a value of zero for $HFN_1$ 506a, then PDU2 502b that is immediately sequentially after PDU1 502a would have a value of zero for $FN_2$ 508b and one for $HFN_2$ 506b. The MAC 129 thus assigns a value of 255 to the HFN/FN pair 504a, and a value of 256 to the HFN/FN pair 504b. The HFN 129a/FN 129b pair of FIG. 8 are intended to represent every HFN/FN pair 504 assigned to PDUs for each buffer 127a to 127d. The assignation may be completely performed by the MAC layer 129, as is done for the TM channels 126a to 126c, or performed by an RLC layer 122a of the layer 2 interface, as is done for the signaling channel 126d. The exact method employed for the assignation of the HFN 129a/FN 129b pair for each PDU along every channel 126a to 126d is not of direct importance to the present invention, but only that such an assignation exists.

An encryption engine 128 is used to encrypt the PDUs from the channels 126a to 126d. The encryption engine 128 is part of the layer 2 interface 122, and, depending on the transmission mode used, may be in either the MAC layer 129 or in the RLC layer 122a. As described in the Description of the Prior Art, encryption along AM and UM channels is performed in the RLC layer 122a of the layer 2 interface, whereas for TM channels, encryption is performed in the MAC layer 129. As the present example is primarily concerned with TM channels, the encryption engine 128 is shown within the MAC layer 129. The encryption engine uses the HFN 129a/FN 129b pair, and either a ciphering key 128a or a new ciphering key 128b, to encrypt the PDU data. Encrypted PDUs are then sent to the layer 1 interface 121 for transmission.

A similar arrangement exists on the second station 130, with buffers 137a, 137b, 137c and 137d for each communication channel 136a, 136b, 136c and 136d, respectively. A MAC layer 139, or an RLC layer 132a, keeps track of an HFN 139a/FN 139b pair for each received PDU from the layer 1 interface 131. A decryption engine 138 uses the HFN 139a/FN 139b pair of each PDU, and either a ciphering key 138a or a new ciphering key 138b, to decrypt the received PDUs. The HFN 139a/FN 139b pair for each received PDU along the channels 136a to 136d should be identically synchronized with the HFN 129a/FN 129b pair of the corresponding transmitted PDUs along the respective channels 126a to 126d. Only this will ensure a proper encryption/decryption cycle of the PDUs.

The MAC 129 (or RLC layer 122a) of the first station 120 uses an activation time 129c to determine if a transmitted PDU should be encrypted using the ciphering key 128a or the new ciphering key 128b. Each buffer 127a to 127d has its own activation time 129c. PDUs with an associated HFN 129a/FN 129b pair that is sequentially before the activation time 129c are encrypted using the ciphering key 128a. PDUs with an associated HFN 129a/FN 129b pair that is sequentially after the activation time 129c are encrypted using the new ciphering key 128b. Similarly, the MAC 139 (or RLC layer 132a) of the second station 130 uses an application time 139c to determine if a received PDU should be decrypted using the ciphering key 138a or the new ciphering key 138b. Again, each buffer 137a to 137d has its own application time 139c. PDUs with an associated HFN 139a/FN 139b pair that is sequentially before the application time 139c are decrypted using the ciphering key 138a. PDUs with an associated HFN 139a/FN 139b pair that is sequentially after the application time 139c are decrypted using the new ciphering key 138b. It is the purpose of the ciphering reconfiguration activation command 110 to supply the second station with an application time 139c for each channel 136a to 136d that corresponds to the activation time 129c of each channel 126a to 126d.

When the layer 3 interface 123 of the first station 120 determines that a ciphering key change is required, the layer 3 interface 123 composes the ciphering reconfiguration activation command 110 and sends the ciphering reconfiguration activation command 110 to the second station 130. Each activation time 116 in the ciphering reconfiguration activation command 110 corresponds to one of the channels 126a to 126d, and hence to one of the channels 136a to 136d. For example, activation time$_1$ 116a corresponds to an activation time 129c for channel 126a. Activation time$_2$ 116b corresponds to an activation time 129c for channel 126b, and so forth. Each channel 126a to 126d must have an associated activation time 116 to effect a ciphering key change synchronization for that channel 126a to 126d to ensure proper communications with the corresponding channel 136a to 136d. For each channel 126a to 126d, the layer 3 interface 123 determines an activation time 129c. The activation time 129c for that channel 126a to 126d is simply the HFN 129a/FN 129b pair of a crossover PDU. The crossover PDU is the sequentially earliest PDU in that channel 126a to 126d that utilizes the new ciphering key 128b for encryption. The layer 3 interface 123 then extracts the 2 LSBs of the HFN 129a of the crossover PDU and places them into the LSB 118 of the activation time 116 of the ciphering reconfiguration activation command 110 for that channel 126a to 126d. The layer 3 interface 123 uses the FN 129b of the crossover PDU for the corresponding identifying FN field 117 of the activation time 116.

Figure 10:
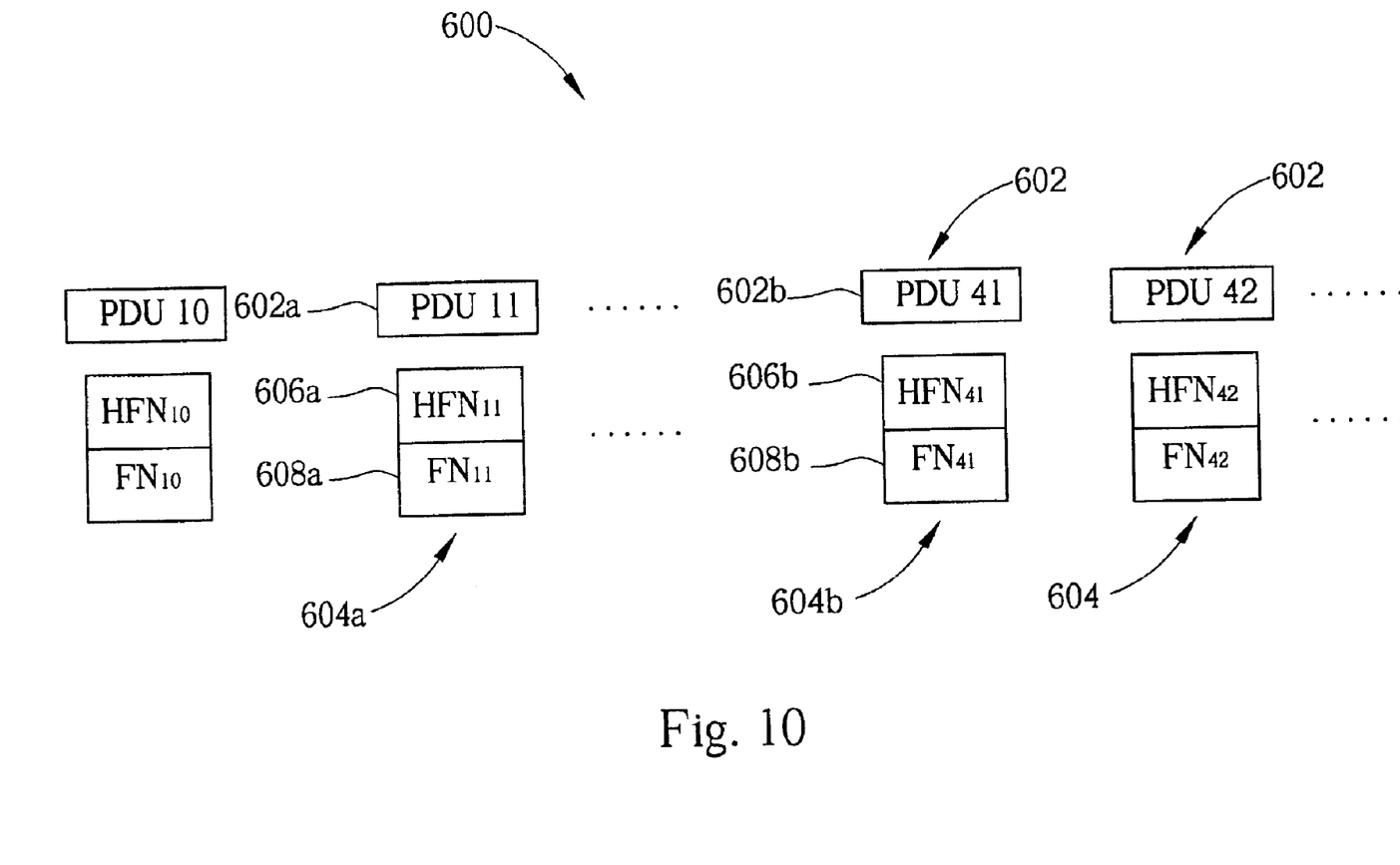
FIG. 10 illustrates a stream of PDUs held in a buffer and awaiting transmission.

To better understand the above by way of a specific example, please refer to FIG. 10 in conjunction with FIG. 7 and FIG. 8. FIG. 10 illustrates a stream of PDUs 600 held in the buffer 127a and awaiting transmission. The stream of PDUs 600 comprises a plurality of sequential PDUs 602, each with an associated HFN 129a/FN 129b pair 604 assigned to the PDU 602 by the MAC 129, as each PDU 602 is a TM PDU 602. It is assumed that, at the time that the layer 3 interface 123 decides to effect a ciphering key change, PDU11 602a is the next in line to be transmitted, and that PDU11 602a has a value of zero for HFN$_{11}$ 606a and a value of 240 for FN$_{11}$ 608a. PDU11 602a thus has an HFN 129a/FN 129b pair 604a of 240. The layer 3 interface 123 determines that the activation time 129c for this channel 126a will be 30 PDUs 602 later. PDU41 602b is thus the crossover PDU 602b, and will be the sequentially first PDU 602 that is encrypted using the new ciphering key 128b. Crossover PDU41 602b has a value of one for HFN$_{41}$ 606b, and a value of 14 for FN$_{41}$ 608b. Crossover PDU41 602b thus has an HFN 129a/FN 129b pair 604b of 270. 270 is thus the activation time 129c for channel 126a. Activation time$_1$ 116a in the ciphering reconfiguration activation command 110 corresponds to channel 126a. LSB$_1$ 118a is thus filled with the two LSBs of HFN$_{41}$ 606b, i.e., 01 binary. FN$_1$ 117a is similarly filled with the value of FN$_{41}$ 608b, i.e., 14, which is the identifying FN 129b of the crossover PDU 602b. This process is performed by the layer 3 interface 123 for all of the channels 126a to 126d.

The addition of the LSBs 118 in the activation times 116 of the ciphering reconfiguration activation command 110 enables the second station 130 to remove any ambiguity as regarding the cyclical positioning of the identifying FNs 117. Upon reception of the ciphering reconfiguration activation command 110, the second station 130 utilizes both the LSBs 116 and the identifying FNs 117 of each activation time 116 to construct an application time 139c for each channel 136a to 136d. In keeping with the above example, we may suppose that, by the time the second station 130 has received the ciphering reconfiguration activation command 110, a last PDU received on channel 136a was assigned an HFN 139a value of one, and an FN 139b value of 18. This comes to a total HFN 139a/FN 139b pair value of 274 for the last received PDU. The value of LSB$_1$ 118a is 01 binary in the activation data 114, which equals the two LSBs of the HFN 139a for the last received PDU. By performing this comparison, the second station 130 determines that the cyclical position for the identifying FN, 117a is in the same cycle as the HFN 139a for channel 136a. FN$_1$ 117a, however, with a value of 14, is less than the FN 139b value of 18 for the last received PDU on channel 136a. The second station 130 can thus correctly determine that the application time 139c for channel 136a must be applied immediately (and hence the new ciphering key 138b), as the application time 139c is 270, which is less than the HFN 139a/FN 139b pair value of 274.

Similarly, if activation time$_1$ 116a were set by the first station 120 to be much farther ahead such that LSB$_1$ 118a had a value of 10 binary, then the second station 130, noting that 10 binary exceeds the current value of 01 binary for the LSBs of HFN 139a, would determine that FN$_1$ 117a was to be applied to the next FN cycle for the HFN 139a, and hence the application time 139c for channel 136a would be 526 (256*2+14). That is, the second station would determine that FN$_1$ 117a is in a cyclical position for a next value of HFN 139a for channel 136a.

Ambiguity for the application time 139c can still exist. In keeping with the above example, if LSB$_1$ 118a were to hold a value of 11 binary, the second station 130 might not know if this value is intended to indicate a cycle that is two units before or after the current HFN value 139a for channel 136a. Such ambiguities, however, would only result due to excessive delays between the reception of the ciphering reconfiguration activation command 110 by the second station 130, or to activation times 129c of the first station 120 that are predicted too far forward, sequentially. To overcome this, the bit-width of the LSBs 118 in the activation data 114 can be expanded. Three LSBs of the HFN 129a portion of the activation time 129c might be used, for example, for each LSB field 118. Alternatively, the entire activation time 129c for each channel 126a to 126d might be used for the activation data 114. In this case, 32 bits for each activation time 116 would be transmitted, instead of merely 10 as required in the preferred embodiment, as each LSB 118 would simply contain the entire 24-bit or 20-bit value of the activation time 129c HFN 129a.

The above has been used to indicate, in detail, a particular manner of applying the method of the present invention. Of key importance to the present invention is that, whereas the prior art includes only the identifying FN of a PDU into a message, the present invention method adds a new field to each identifying FN. This new field includes the LSBs of the HFN associated with the identifying FN. Though, as indicated above, the present invention method is particularly well suited for the proper synchronization of ciphering key changes, the method could also be used for other types of messages, be they layer 2 or layer 3 messages, to remove FN cyclical ambiguities. By including the LSBs of the HFN associated with an identifying FN, a receiving station of the message can more accurately determine the cyclical positioning of the identifying FN within the associated HFN.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for synchronizing a ciphering key change in a wireless communications system, the wireless communications system comprising:
a first station capable of receiving a security mode command to effect a ciphering change, and capable of receiving encrypted layer 2 protocol data units (PDUs), each received PDU being sequentially identified by an n-bit frame number (FN), the first station comprising:
a decryption unit capable of decrypting received PDUs according to at least a first ciphering key, a first m-bit hyper frame number (HFN) which is a function of the FN for each received PDU, and the FN of each received PDU; and
a second station capable of transmitting the security mode command, capable of assigning each transmitted PDU with an n-bit FN and capable of transmitting encrypted PDUs, the second station comprising:
an encryption unit capable of encrypting transmitted PDUs according to at least the first ciphering key, a second m-bit HFN which is a function of the FN for each transmitted PDU and is synchronized with the first m-bit HFN, and the FN associated with each transmitted PDU;
the method comprising:
the second station determining an activation time at which a ciphering key change is to occur, the activation time corresponding to a second HFN/FN sequence pair for a crossover PDU, the crossover PDU being the sequentially earliest PDU encrypted using a second ciphering key;
the second station composing the security mode command, the security mode command comprising a switching FN corresponding to the activation time, and x least-significant bits (LSBs) from the second HFN corresponding to the crossover PDU;
the second station transmitting the security mode command;
the first station receiving the security mode command;
the first station utilizing the switching FN and the x LSBs from the second HFN contained in the security mode command to obtain an application time; and
the first station using the first ciphering key to decrypt PDUs with FNs sequentially prior to the application time, and using the second ciphering key to decrypt PDUs with FNs sequentially on or after the application time, wherein the second ciphering key is different from the first ciphering key.

2. The method of claim 1 wherein the first station increments the first HFN by a predetermined value on detection of roll-over of an FN of a received PDU.

3. The method of claim 1 wherein the second station increments the second HFN by a predetermined value on detection of roll-over of an FN of a transmitted PDU.

4. The method of claim 1 wherein the application time corresponds to a synchronized first HFN/FN sequence pair for a corresponding received PDU.

5. The method of claim 1 wherein the activation time is equal to the application time.

6. The method of claim 1 wherein x is greater than or equal to 2.

7. The method of claim 1 wherein x is equal to m.

8. The method of claim 1 wherein the first station compares the x LSBs from the second HFN contained in the security mode command to determine a cyclical positioning of the switching FN within the first HFN. encrypted PDUs; wherein PDUs that are sequentially before the application time are encrypted using the first ciphering key, and PDUs sequentially on or after the application time are encrypted using the second ciphering key.

9. A wireless communications system comprising:
a first station capable of receiving encrypted layer 2 protocol data units (PDUs), and capable of receiving a security mode command, the first station comprising:
a receiving buffer for storing received PDUs;
a means for associating a sequentially ordered n-bit frame number (FN) with each received PDU by the first station;
a means for maintaining an m-bit hyper frame number (HFN) as a function of the associated FN for each received PDU by the first station;
an extraction unit for obtaining an application time from a switching FN and x least significant bits (LSBs) of a second HFN, the switching FN being the FN of a crossover PDU and the second HFN being the HFN of the crossover PDU, the switching FN and the x LSBs of the second HFN being contained in the security mode command;
a means for storing a first ciphering key;
a means for storing a second ciphering key, the second ciphering key being different from the first ciphering key;
a second station capable of transmitting encrypted layer 2 PDUs, and capable of transmitting a security mode command, the second station comprising:
an encryption unit capable of generating an activation time, the activation time corresponding to an HFN/FN sequence pair for the crossover PDU, the crossover PDU being the sequentially earliest PDU encrypted by the encryption unit using the second ciphering key; and
a decryption unit for decrypting the received PDUs, the decryption unit using the first ciphering key to decrypt any received PDU with an HFN/FN pair that is sequentially before the application time, and using the second ciphering key to decrypt any received PDU with an HFN/FN pair that is sequentially on or after the application time.

10. The system of claim 9 wherein PDUs that are sequentially before the application time are encrypted using the first ciphering key, and PDUs sequentially on or after the application time are encrypted using the second ciphering key.

11. The system of claim 10 wherein the HFN of each received PDU is synchronized with a corresponding HFN on the second station for each PDU transmitted by the second station.

12. The system of claim 9 wherein the application time corresponds to a synchronized HFN/FN sequence pair for a corresponding PDU received by the first station.

13. The system of claim 12 wherein the activation time is equal to the application time.

14. The system of claim 11 wherein the first station increments the HFN associated with a first PDU by a predetermined value on rollover of the FN associated with the first PDU.

15. The system of claim 11 wherein x is greater than or equal to 2.

16. The system of claim 11 wherein x is equal to m.

17. A method for removing cyclical ambiguity of an n-bit identifying frame number (FN) transmitted in a signaling message from a first station to a second station in a wireless communications system, the method comprising:

the first station placing an identifying FN for identifying a layer 2 protocol data unit (PDU) in a stream of transmitted PDUs, into a first field of a message;

the first station placing x least significant bits (LSBs) from a first m-bit hyper frame number (HFN) value associated with the identifying FN in a second field of the message, the first HFN being incremented by a first value upon detection of roll-over of an FN in the stream of transmitted PDUs; and the first station transmitting the message to the second station;

the second station receiving the message and using the x LSBs of the second field to determine a cyclical position of the identifying FN of the first field;

wherein x<m.

18. The method of claim 17 wherein x is greater than or equal to two.

19. The method of claim 17 wherein the second station has a second HFN that is synchronized with the HFN of the first station, the second HFN being incremented by the first value upon detection of roll-over of an FN in the stream of received PDUs and the second station uses the x LSBs of the second field to determine the cyclical position of the identifying FN within the second HFN.

20. The method of claim 1 wherein x is equal to 2.

21. The method of claim 1 wherein x is less than m.

22. The method of claim 9 wherein x is equal to 2.

23. The method of claim 9 wherein x is less than m.

* * * * *